(12) United States Patent
Autrey et al.

(10) Patent No.: US 9,789,981 B1
(45) Date of Patent: Oct. 17, 2017

(54) COMPACTOR FOR SPACE TOILET

(71) Applicant: HAMILTON SUNDSTRAND CORPORATION, Charlotte, NC (US)

(72) Inventors: David Autrey, Houston, TX (US); Terrell Lee Morrison, League City, TX (US); Cory Kaufman, Webster, TX (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/264,702

(22) Filed: Sep. 14, 2016

(51) Int. Cl.
*B64G 1/60* (2006.01)
*B65F 1/14* (2006.01)
*B30B 1/30* (2006.01)
*B30B 1/04* (2006.01)
*A47K 11/02* (2006.01)
*B65F 1/00* (2006.01)

(52) U.S. Cl.
CPC ............... *B64G 1/60* (2013.01); *A47K 11/02* (2013.01); *B30B 1/04* (2013.01); *B30B 1/30* (2013.01); *B65F 1/0006* (2013.01); *B65F 1/1405* (2013.01); *B65F 2210/12* (2013.01)

(58) Field of Classification Search
CPC .... B64G 1/60; B30B 1/04; B30B 1/30; A47K 11/02; B65F 1/006; B65F 1/1405
USPC ............................. 4/316, 321, 474, 479, 484
See application file for complete search history.

(56) References Cited

U.S. PATENT DOCUMENTS

| | | | |
|---|---|---|---|
| 5,005,457 A | 4/1991 | Thornton, Jr. et al. | |
| 9,187,190 B1 | 11/2015 | Stapleton | |
| 2005/0217512 A1* | 10/2005 | Ruddock | B65F 1/1405 100/226 |

* cited by examiner

*Primary Examiner* — Tuan N Nguyen
(74) *Attorney, Agent, or Firm* — Carlson, Gaskey & Olds, PC

(57) ABSTRACT

A toilet for use on a space vehicle has a toilet bowl having a storage canister at a remote end for receiving human waste. The compactor includes a cable connected to a lever which pulls the cable in a direction forcing the compactor into the storage canister to compact the captured waste when the lever is actuated.

20 Claims, 3 Drawing Sheets

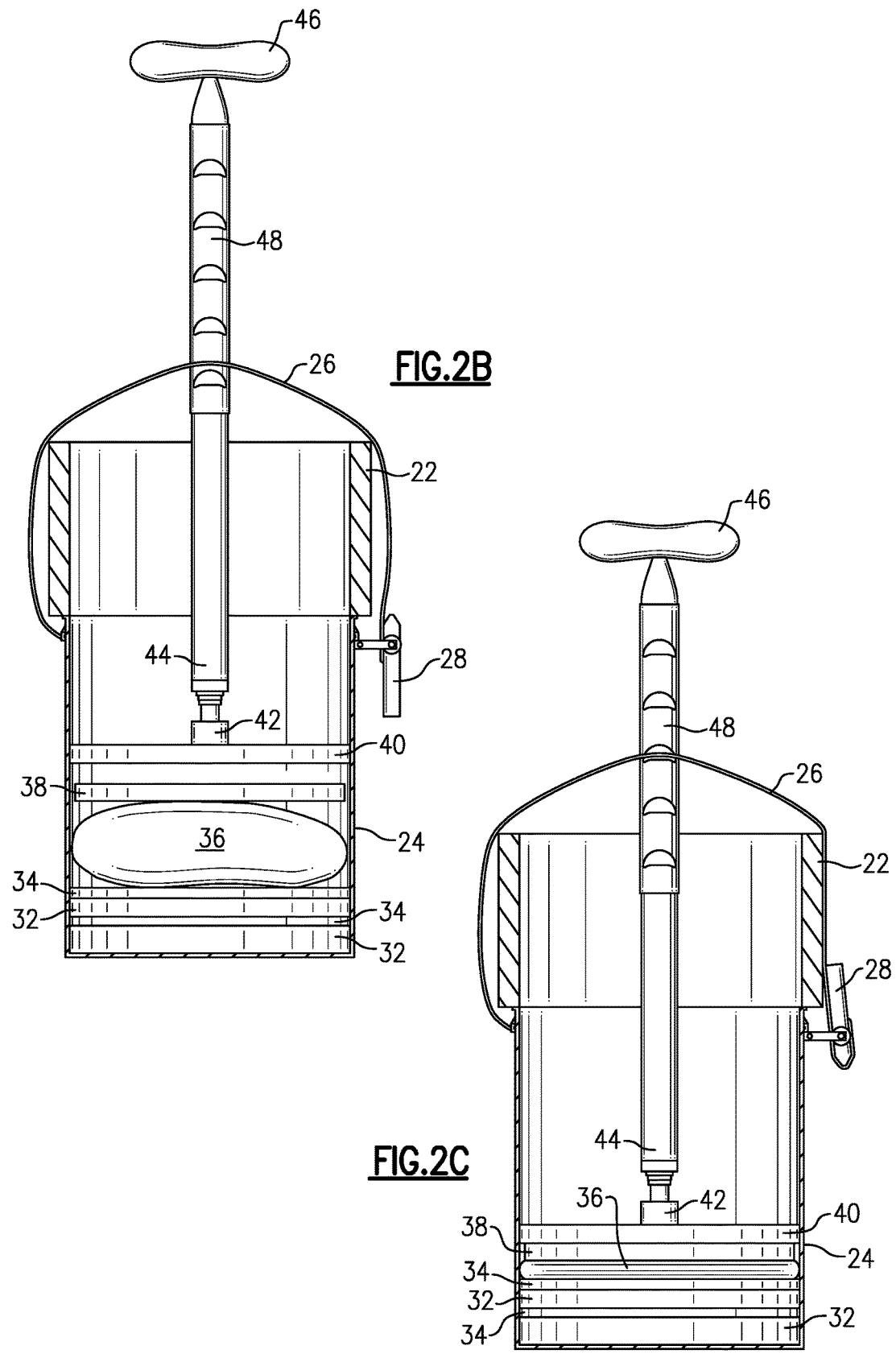

COMPACTOR FOR SPACE TOILET

STATEMENT REGARDING FEDERALLY SPONSORED RESEARCH OR DEVELOPMENT

This invention was made with government support under Contract No. NNH16C087C, awarded by NASA. The Government has certain rights in this invention.

BACKGROUND OF THE INVENTION

This application relates to a simple and efficient compactor for use with a toilet in a space vehicle.

As known, manned space vehicles must utilize storage space very efficiently. One challenge for the design and operation of a space vehicle is the handling of human waste.

Toilets are known wherein fecal matter is gathered and moved into storage bags in a storage canister associated with a toilet. When the canister is full, it is then moved and replaced with another canister. It is desirable to maximize the amount of stored fecal matter in each canister as space is at a premium in a manned space vehicle.

It is known to compact the fecal matter. However, known systems have been rather complex.

SUMMARY OF THE INVENTION

A toilet for use on a space vehicle has a toilet bowl having a storage canister at a remote end for receiving human waste. A compactor includes a cable connected to a lever which pulls the cable in a direction forcing the compactor into the storage canister to compact the waste when the lever is actuated.

These and other features may be best understood from the following drawings and specification.

BRIEF DESCRIPTION OF THE DRAWINGS

FIG. 2B shows a first step in compacting waste material in the toilet.
FIG. 2C shows a subsequent step.

DETAILED DESCRIPTION

Figure 1:
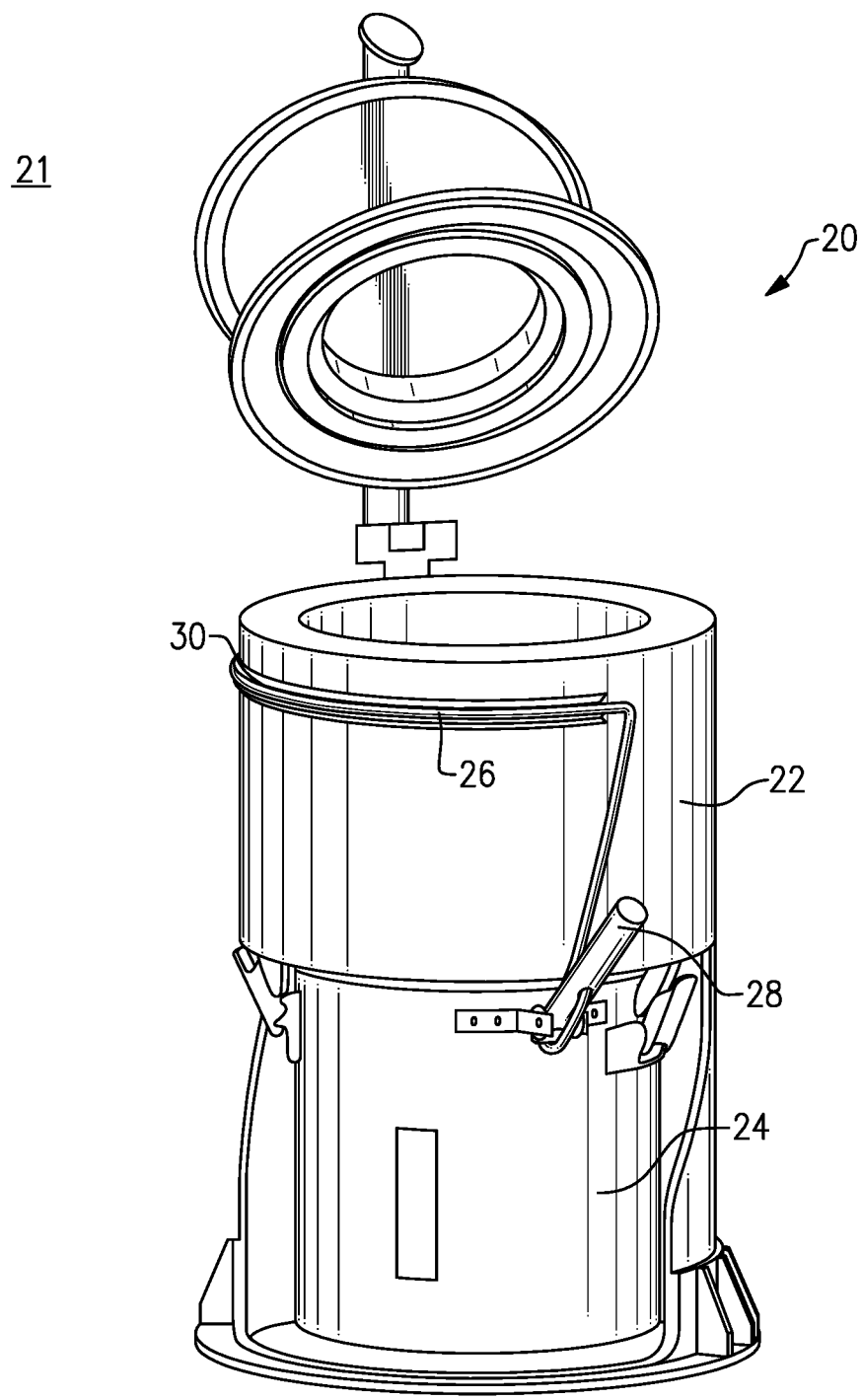
FIG. 1 shows a toilet.

FIG. 1 shows a toilet 20 for use in a space vehicle 21. A toilet bowl 22 is positioned above a storage canister 24. A known system (not illustrated) includes air drive systems for moving captured fecal matter from toilet bowl 22 into containment bags, which are moved into the storage canister 24. A slot 30 is shown storing a cable 26 in this initial position. The toilet 20 would remain in this position until after the fecal matter has been moved into the storage canister 24. A lever 28 is shown connected to the cable 26.

Figure 2A:
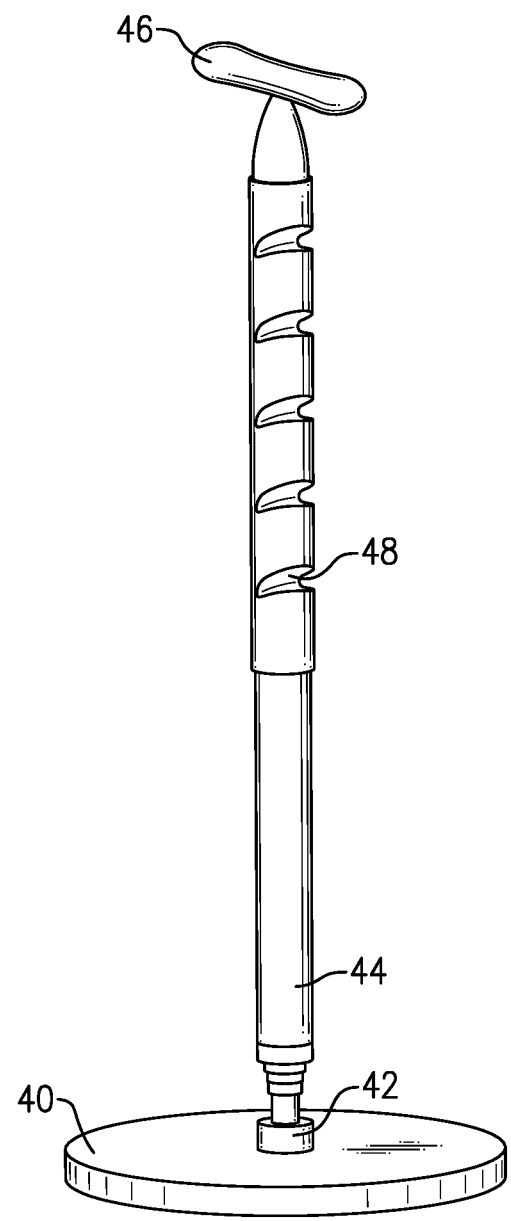
FIG. 2A shows a compactor for use with the toilet.

As shown in FIG. 2A, a compactor includes a handle 46 that can be used to steady the compactor as it is being moved to compact waste. An end plate 40 has a universal connection at 42 to a piston rod 44. The universal connection 42 may be provided by an elastomeric bearing capturing an end of the rod 44. A plurality of slots 48 are also formed in the rod 44.

As shown in FIG. 2B, prior compacted waste bags 32 are separated by spacers 34, intended to hold waste in a compacted state and contained from reaching the plunger or plate 40 during a compacting step. A new collection bag 36 is shown. A subsequent spacer 38 has now been added. The compactor is then moved into the storage canister 24. The plunger 40 is put in contact with the spacer 38. The cable 26 is placed into one of the slots 48. The arrangement of several slots 48 allows the cable 26 to be moved into higher or lower slots 48 to provide increased movement of the plunger 40, as will be explained below. Generally, as the storage canister 24 becomes more filled, the cable will be utilized on slots 48 which are closer to the plunger 40.

As shown in FIG. 2B, the lever 28 is in an unactuated position.

In FIG. 2C, the lever 28 has now been pivoted upwardly. This pulls the cable 26 downwardly and forces the rod 44 and hence plunger 40 to compact the bag 36. The force advantage of the cable and lever allow minimal load input while providing high compaction loads. Thus, the simple compactor compacts human waste such that the storage canister 24 can be filled to a higher capacity before being replaced by a subsequent storage canister.

During the compacting, since piston rod 44 is connected to the plunger 40 through a universal connection 42, the plunger 40 may adjust to uneven contours of the waste.

After compacting is complete, the compactor can be removed and the toilet returned to the FIG. 1 condition.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A toilet for use on a space vehicle comprising:
    a toilet bowl having a storage canister at a remote end for receiving human waste; and
    a compactor including a cable connected to a lever which pulls the cable in a direction forcing a plunger into the storage canister to compact the captured waste when the lever is actuated.

2. The toilet for use on a space vehicle as set forth in claim 1, wherein the compactor is removable from the toilet after completion of the compacting step.

3. The toilet for use on a space vehicle as set forth in claim 2, wherein the cable is placed within a slot in a piston rod which moves with the plunger.

4. The toilet for use on a space vehicle as set forth in claim 3, wherein there are a plurality of slots and the cable may be placed into any of said plurality of slots.

5. The toilet for use on a space vehicle as set forth in claim 4, wherein said cable is connected to be pulled by the lever as the lever pivots between an unactuated position and an actuated position.

6. The toilet for use on a space vehicle as set forth in claim 5, wherein said piston rod is connected to the plunger through a universal connection allowing the plunger to adjust to uneven contours of the waste.

7. The toilet for use on a space vehicle as set forth in claim 6, wherein the toilet includes a system for moving fecal matter into a storage bag.

8. The toilet for use on a space vehicle as set forth in claim 7, wherein spacers are placed between the bag and the plunger.

9. The toilet for use on a space vehicle as set forth in claim 3, wherein said piston rod is connected to the plunger through a universal connection allowing the plunger to adjust to uneven contours of the waste.

10. The toilet for use on a space vehicle as set forth in claim 1, wherein the cable is placed within a slot in a piston rod which moves with the plunger.

11. The toilet for use on a space vehicle as set forth in claim 10, wherein there are a plurality of slots and the cable may be placed into any of said plurality of slots.

12. The toilet for use on a space vehicle as set forth in claim 11, wherein said cable is connected to be pulled by the lever as the lever pivots between an unactuated position and an actuated position.

13. The toilet for use on a space vehicle as set forth in claim 12, wherein said piston rod is connected to the plunger through a universal connection allowing the plunger to adjust to uneven contours of the waste.

14. The toilet for use on a space vehicle as set forth in claim 13, wherein the toilet including a system for moving fecal matter into a storage bag.

15. The toilet for use on a space vehicle as set forth in claim 14, wherein spacers are placed between the bag and the plunger.

16. The toilet for use on a space vehicle as set forth in claim 10, wherein said piston rod is connected to the plunger through a universal connection allowing the plunger to adjust to uneven contours of the waste.

17. The toilet for use on a space vehicle as set forth in claim 10, wherein said cable is connected to be pulled by the lever as the lever pivots between an unactuated position and an actuated position.

18. The toilet for use on a space vehicle as set forth in claim 1, wherein said cable is connected to be pulled by the lever as the lever pivots between an unactuated position and an actuated position.

19. The toilet for use on a space vehicle as set forth in claim 1, wherein the toilet including a system for moving fecal matter into a storage bag.

20. The toilet for use on a space vehicle as set forth in claim 19, wherein spacers are placed between the bag and the plunger.

* * * * *